United States Patent
Rodriguez

(10) Patent No.: US 12,541,676 B2
(45) Date of Patent: Feb. 3, 2026

(54) NEUROMETRIC AUTHENTICATION SYSTEM

(71) Applicant: Angel Raphael Rodriguez, Ann Arbor, MI (US)

(72) Inventor: Angel Raphael Rodriguez, Ann Arbor, MI (US)

(73) Assignee: Angel Raphael Rodriguez, Ann Arbor, MI (US)

( * ) Notice: Subject to any disclaimer, the term of this patent is extended or adjusted under 35 U.S.C. 154(b) by 499 days.

(21) Appl. No.: 17/153,453

(22) Filed: Jan. 20, 2021

(65) Prior Publication Data
US 2021/0224637 A1 Jul. 22, 2021

Related U.S. Application Data

(60) Provisional application No. 62/963,427, filed on Jan. 20, 2020.

(51) Int. Cl.
*G06N 3/06* (2006.01)
*G06F 21/33* (2013.01)
*H04L 9/40* (2022.01)
*H04L 12/18* (2006.01)

(52) U.S. Cl.
CPC .......... *G06N 3/061* (2013.01); *G06F 21/33* (2013.01); *H04L 12/189* (2013.01); *H04L 63/0807* (2013.01)

(58) Field of Classification Search
CPC ........ G06N 3/061; G06N 3/045; G06N 3/084; G06N 20/10; G06F 21/33; G06F 21/32; H04L 12/189; H04L 63/0807; H04L 63/0861; H04W 4/80
See application file for complete search history.

(56) References Cited

U.S. PATENT DOCUMENTS

| | | | |
|---|---|---|---|
| 10,939,297 B1* | 3/2021 | Indurkar | H04L 63/126 |
| 10,999,066 B1* | 5/2021 | Griffin | H04W 12/06 |
| 2013/0179087 A1* | 7/2013 | Garripoli | G06F 3/015 |
| | | | 702/19 |
| 2018/0317795 A1* | 11/2018 | Couser | A61B 5/6803 |
| 2020/0107877 A1* | 4/2020 | Koblish | A61B 5/01 |
| 2020/0194008 A1* | 6/2020 | Lee | G10L 17/22 |
| 2020/0234605 A1* | 7/2020 | Shuart | G06F 21/316 |
| 2020/0311616 A1* | 10/2020 | Rajkumar | G06N 3/008 |
| 2021/0109596 A1* | 4/2021 | Nath | G01L 1/04 |
| 2021/0390366 A1* | 12/2021 | Furman | G06F 3/016 |
| 2022/0016423 A1* | 1/2022 | Vysokov | A61N 1/0476 |

OTHER PUBLICATIONS

Li, QianQian, Ding Ding, and Mauro Conti. "Brain-computer interface applications: Security and privacy challenges." 2015 IEEE conference on communications and network security (CNS). IEEE, 2015. (Year: 2015).*

\* cited by examiner

*Primary Examiner* — Li B. Zhen
*Assistant Examiner* — Henry Nguyen
(74) *Attorney, Agent, or Firm* — Vivacqua Crane, PLLC

(57) ABSTRACT

A computing device includes at least one sensor configured to generate voltage signals indicative of a measured neurological impulse and one or more application specific integrated circuit (ASIC) chips connected to the at least one sensor. The one or more ASIC chips configured to determine at least one command for operating a device based on the measured neurological impulse and to transmit the at least one command to the device.

16 Claims, 7 Drawing Sheets

NEUROMETRIC AUTHENTICATION SYSTEM

BACKGROUND

Interfaces between brain tissue and computer systems continues to evolve. Sensors, such as electrodes or the like, can interface with brain tissue to measure neurological events.

SUMMARY

A computing device includes at least one sensor configured to generate voltage signals indicative of a measured neurological impulse and one or more application specific integrated circuit (ASIC) chips connected to the at least one sensor. The one or more ASIC chips are configured to determine at least one command for operating a device based on the measured neurological impulse and to transmit the at least one command to the device.

In other features, the one or more ASIC chips encodes data indicative of the voltage signals from a first domain to a second domain.

In other features, the first domain comprises a time domain and the second domain comprises a frequency domain.

In other features, the one or more ASIC chips are configured to classify the data encoded in the second domain.

In other features, the one or more ASIC chips access a database to compare the classified data to stored data, and the one or more ASIC chips are configured to transmit data to a particular computing device when the classified data corresponds to the stored data.

In other features, the one or more ASIC chips are configured to classify the data encoded in the second domain via at least one of a support-vector machine or a deep neural network.

In other features, the deep neural network comprises a convolutional neural network.

In other features, the one or more ASIC chips encodes the at least one command as a token that includes verification data, wherein a destination computing device verifies the verification data prior to performing an action based on the at least one command.

In other features, the verification data comprise a randomly generated seed corresponding to a user.

In other features, the token is broadcast to one or more computing devices within communication range of the computing device.

A computing device includes at least one sensor configured to generate voltage signals indicative of a measured neurological impulse and one or more application specific integrated circuit (ASIC) chips connected to the at least one sensor. The one or more ASIC chips are configured to determine at least one command for operating a device based on the measured neurological impulse and to transmit the at least one command to the device, wherein the one or more ASIC chips encodes data indicative of the voltage signals from a first domain to a second domain.

In other features, the one or more ASIC chips encodes data from the first domain to the second domain via Riemannian Geometry.

In other features, the first domain comprises a time domain and the second domain comprises a frequency domain.

In other features, the one or more ASIC chips are configured to classify the data encoded in the second domain.

In other features, the one or more ASIC chips access a database to compare the classified data to stored data, and the one or more ASIC chips are configured to transmit data to a particular computing device when the classified data corresponds to the stored data.

In other features, the one or more ASIC chips are configured to classify the data encoded in the second domain via at least one of a support-vector machine or a deep neural network.

In other features, the deep neural network comprises a convolutional neural network.

In other features, the one or more ASIC chips encodes the at least one command as a token that includes verification data, wherein a destination computing device verifies the verification data prior to performing an action based on the at least one command.

In other features, the verification data comprise a randomly generated seed corresponding to a user.

In other features, the token is broadcast to one or more computing devices within communication range of the computing device.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Brain cells communicate via electrical impulses. This electrical activity can be detected and measured via various techniques. For example, magnetoencephalography (MEG) and electroencephalogram (EEG) techniques may be used to detect and measure electrical impulses generated by brain activity.

The present disclosure generally relates to brain-computer interfaces and a computing device for generating commands based on a measured brain activity. Brain-computer interfaces (BCIs) are devices that provide a communication pathway between an enhanced or wired brain and an external device. The computing device detects electrical activity in the brain using sensors attached to portions of the head. The computing device can measure the electrical activity and generate one or more signals indicative of the measured electrical activity.

Figure 1:
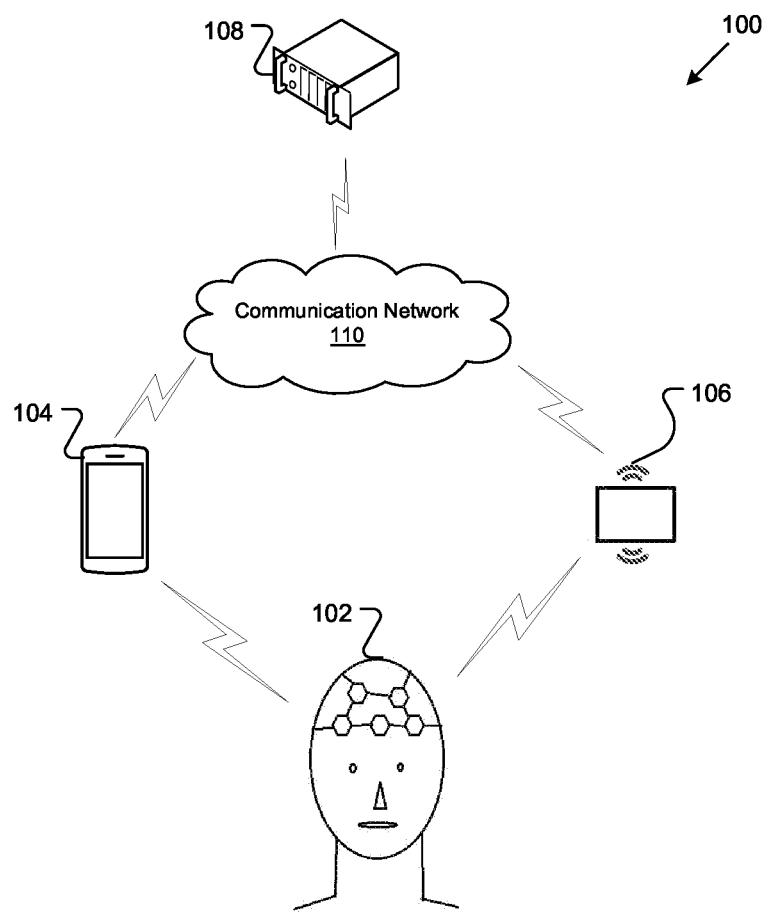
FIG. 1 is a block diagram illustrating a neurometric authentication system in accordance with an example implementation of the present disclosure.

FIG. 1 illustrates an example neurometric authentication system 100 according to an example implementation of the present disclosure. As shown, the neurometric authentication system 100 includes a computing device 102, a computing device 104, a computing device 106, and a server 108. As shown, the system 100 also includes a communication network 110 that allows communication between the computing device 104, the computing device 106, and/or the server 108. In an example implementation, the computing device 104 may be a mobile computing device, e.g., laptop, smartphone, smart tablet, etc., and the computing device 106 may be an Internet of Things (IoT) device. An IoT device may be a computing device associated with consumer applications, connected vehicles, home automation, wearable technology, and the like. The computing devices 104, 106 and the server 108 may each include a respective processor and memory.

The communication network 110 may include any telecommunication or computer network. Examples of computer networks configurable to operate as the communication network 110 include, without limitation, a wireless network, landline, cable line, fiber-optic line, local area network (LAN), wide area network (WAN), or the like. The network may also comprise subsystems that transfer data between servers or computing devices. For example, the communication network 110 may also include a point-to-point connection, the Internet, an Ethernet, a backplane bus, an electrical bus, a neural network, or other internal system.

As discussed below, the computing device 102 includes one or more sensors that may be positioned about a user to measure an electrical activity of the user. In some implementations, the user may position the computing device 102 such that the computing device 102 is retained by the user's ear. The sensors are configured to receive, i.e., measure, neurological impulses such that the computing device 102 can generate voltage signals indicative of the electrical activity. In some examples, the sensors can contact the outside of the brain or rest on the outside of the skull. In another example, the sensors can be implanted into brain tissue itself. It is understood that the computing device 102 may use any suitable technique for mapping brain activity, such as EEG or MEG techniques.

Figure 2:
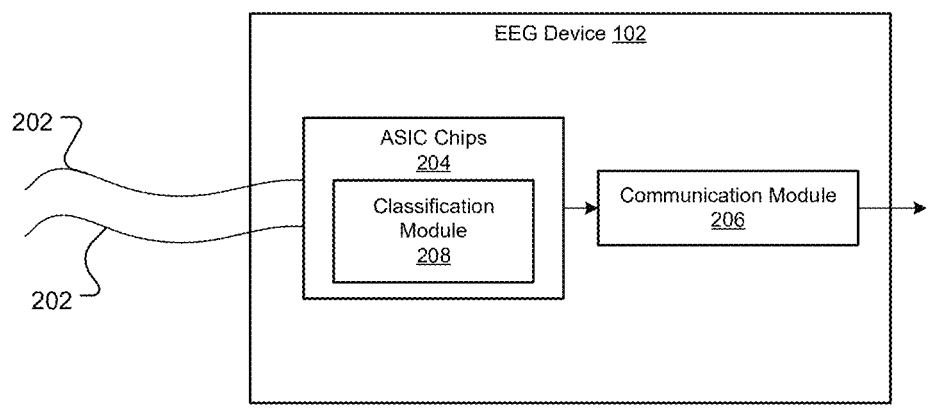
FIG. 2 is a block diagram of an example computing device for monitoring and generating commands based on a measured neurological event.

FIG. 2 illustrates an example implementation of the computing device 102. As shown, the computing device 102 includes sensors 202 and one or more processors, such as application specific integrated circuit (ASIC) chips 204, that are connected to the sensors 202. In an example implementation, the sensors 202 can comprise electrodes. These ASIC chips 204 may be referred to as a SoC (system-on-chip) with their own ROM, RAM, EEPROM, flash memory, etc.

The ASIC chips 204 receive, amplify, digitize, and process the voltage signals of the sensors 202 into data packets. As discussed further herein, the ASIC chips 204 may determine one or more device command signals to generate based on the data packets. The computing device 102 also includes a communication module 206 that is configured to transmit the device command signals to one or more devices. As described in greater detail below, the ASIC chips 204 include a classification module 208 that classifies measured data and generates a command based on the measured data.

The communication module 206 is representative of a variety of communication components and functionality, including, but not limited to: one or more antennas; a browser; a transmitter and/or receiver; a wireless radio; data ports; software interfaces and drivers; networking interfaces; data processing components; and so forth.

As discussed in greater detail herein, the computing device 102 measures mental activity and/or biometric data of the user and generates commands based on the measured mental activity and/or biometric data. Biometric data can be measured using suitable measurement devices, and biometric data can include, but is not necessarily limited to, eye muscle movement, facial muscle movement, neck muscle movement, and the like.

The computing device 102 may preprocess the data indicative of the measured mental activity and/or biometric data, e.g., the voltage signals. For example, the computing device 102 may use a fast Fourier transform (FFT), Riemannian Geometry, or other suitable filtering techniques to convert data representing the measurement signals from a first domain to a second domain. For example, the computing device 102 converts the data representing the measurement signals from the time domain to the frequency domain. The data encoded in the second domain may then be provided to the classification module 208 for classification.

In an example implementation, the classification module 208 may comprise a support-vector machine (SVM) to classify measured mental activity and/or biometric data. In another example implementation, the classification module 208 comprises a deep neural network (DNN) 300 to classify measured mental activity and/or biometric data, such as a convolutional neural network.

Figure 3:
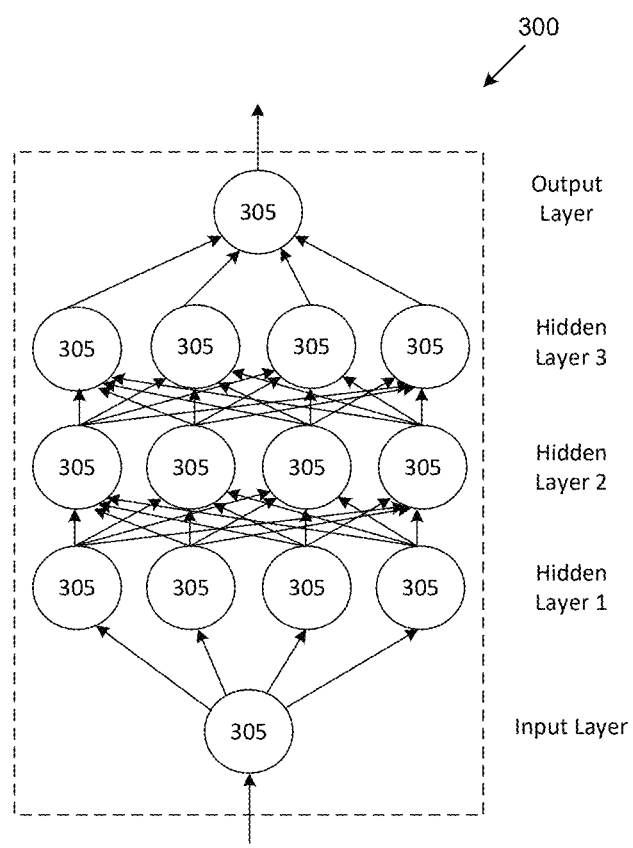
FIG. 3 is a diagram of an example deep neural network.

FIG. 3 is a diagram of an example deep neural network (DNN) 300, which may be stored in the ASIC chips 204. The DNN 300 includes multiple nodes 305, and the nodes 305 are arranged so that the DNN 300 includes an input layer, one or more hidden layers, and an output layer. Each layer of the DNN 300 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as backpropagation with optimizations.

Figure 4A:
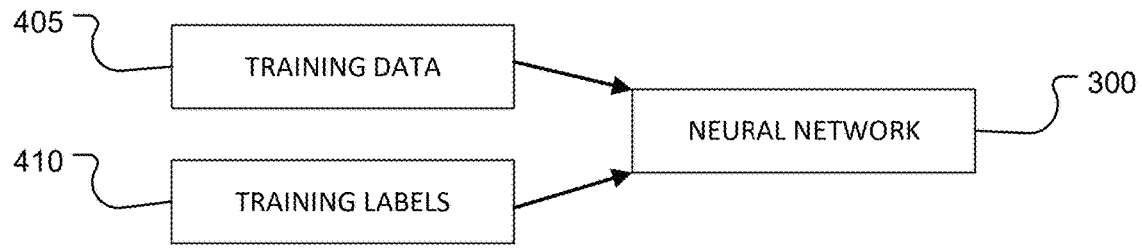
FIGS. 4A through 4C are diagrams of an example deep neural network.
Figure 4B:
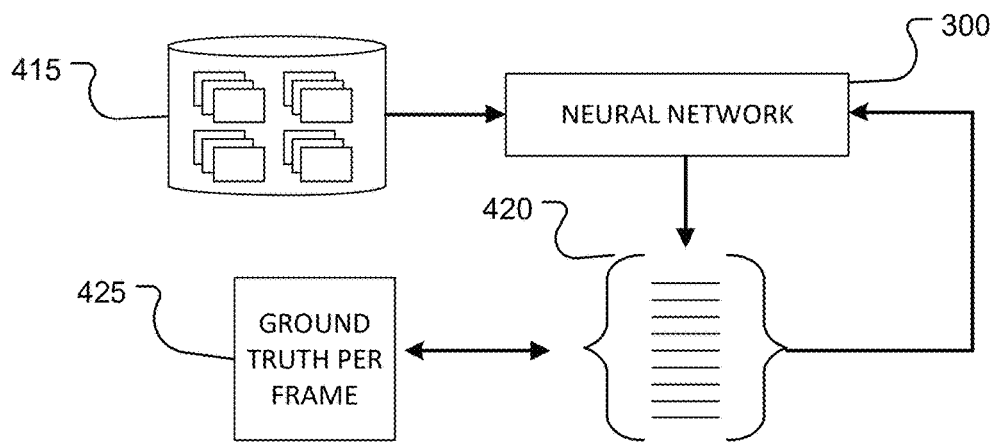

FIGS. 4A and 4B illustrate an example of a process of supervised training of a DNN 300 in accordance with one or more implementations of the present disclosure. As shown in FIG. 4A, during an initial training phase, a DNN 300 receives a set of labeled training data (e.g., training data 405 and training labels 410). The training data 405 may comprise measured voltage signals indicative of a device command associated with a particular user for a particular computing device, and the training labels 410 can comprise device commands corresponding to the measured voltage signals. For instance, one or more users may perform one or more predetermined mental tasks, and the computing device 102 measures the electrical activity associated with the mental tasks.

After the initial training phase, at a supervised training phase, a set of N training data 415, e.g., voltage signals from the computing device 102, are input to the DNN 300. The DNN 300 generates outputs indicative of the device command for a particular computing device for each of the N training data 415.

FIG. 4B illustrates an example of generating output, e.g., device command, for one training data 415 of the N training data 415. Based on the initial training, the DNN 300 outputs a vector representation 420 of the proposed device commands. The vector representation 420 is compared to the ground-truth data 425. The DNN 300 updates network parameters based on the comparison to the ground-truth data 425. For example, the network parameters may be updated via backpropagation. The DNN 300 may be trained at the server 108 and provided to the computing device 102 via the communication network 110.

Figure 4C:
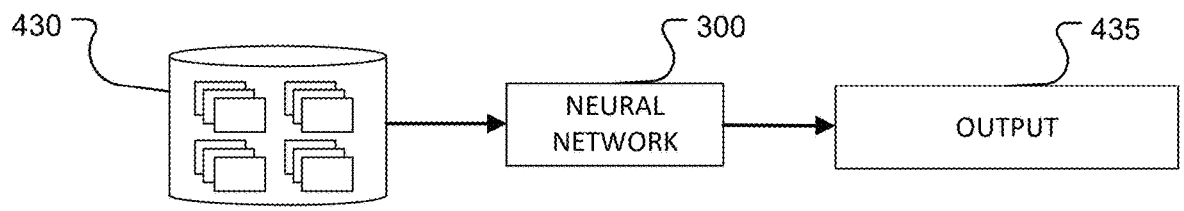

After training, the classification module 208 may be used to generate commands based on received voltage signals as shown in FIG. 4C. In various implementations, the output 435 of the classification module 208 is a device command.

Once trained, the DNN 300 can generate a device command for a particular computing device based on the DNN 300 input. The device command can be transmitted to the particular computing device, e.g., computing device 104, 106. In various implementations, the computing device 102 may transmit data packets including the device command to the particular computing device via short-wavelength radio waves, e.g., Bluetooth, near-field communication (NFC), etc.

In one or more implementations, the computing device 102 may be configured to provide feedback to a user to train and/or validate actions performed by the user. The feedback may comprise audio feedback and/or video feedback. For example, the user may use the feedback to consciously and/or subconsciously modify the user's behavior to modify the user's biometric measurements.

Figure 5:
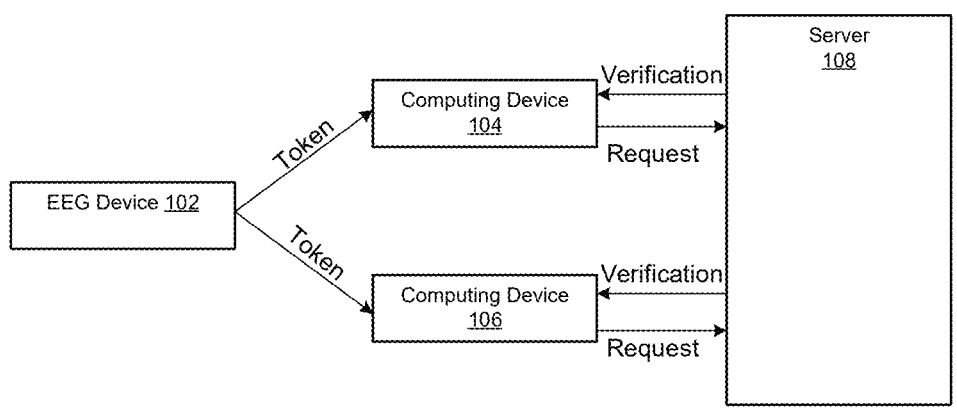
FIG. 5 is a diagram of a process for generating and authenticating a token within the neurometric authentication system.

FIG. 5 illustrates an example diagram for controlling operation the computing devices 104, 106 using the computing device 102. As discussed above, the computing device 102 generates one or more device commands, via the DNN 300 or SVM, based on a measured mental activity and/or biometric data of a user. The computing device 102 generates a token that can be transmitted to a particular computing device per the measured mental activity and/or biometric data of the user. For example, the token can be generated and transmitted by the communication module 206 of the computing device 102. The token can include the device command and verification data generated by the ASIC chips 204. In various implementations, the verification data comprises a randomly generated seed that verifies the user. In some instances, the token is broadcast to all computing devices within communication range of the computing device 102. The ASIC chips 204 can determine a particular computing device 104, 106 based on the measured mental activity, e.g., mental activity includes measured activity identifying a particular device. The generated token can include destination data indicating which computing device 104, 106 the token is intended.

In some implementations, the communication module 206 encodes and transmits multiple device commands as a single command. For example, based on the measurements of the mental activity and/or biometric data, the computing device 102 may determine that the user has initiated multiple discrete device commands. In this implementation, the communication module 206 may encode and transmit the device commands as a single device command, e.g., a macro command. The receiving computing device may include buffering capabilities such that the discrete device commands are saved and performed based on the macro command.

The token is transmitted to the determined computing device 104, 106. Upon receiving the token, the corresponding computing device 104, 106 can transmit a request to the server 108 to verify the token. For instance, the corresponding computing device 104, 106 can provide the verification data to the server 108 such that the server 108 can verify the token was transmitted by a valid user. If the server 108 verifies the verification data, the server 108 transmits a verification message to the corresponding computing device 104, 106. Upon receiving the verification message from the server 108, the corresponding computing device 104, 106 can perform the action according to the device command transmitted by the computing device 102.

The classification module 206 can include a database that relates the measured signals with device commands. In various implementations, the database may be a lookup table. In some implementations, a user may perform an activity corresponding to a preassigned directive for measurement purposes. For example, the user may be instructed to perform a preassigned mental activity such that computing device 102 can measure the activity corresponding to the preassigned mental activity. Data representing the preassigned mental activity can be compared with one or more entries, e.g., data for allowing communication with a particular computing device, within the database. If the data representing the preassigned mental activity corresponds to data within the database, the computing device 102 can communicate with the particular computing device. Otherwise, the computing device 102 may not issue data for the particular computing device. The measured signals can then be paired with a specific computing device command within the lookup table.

Figure 6:
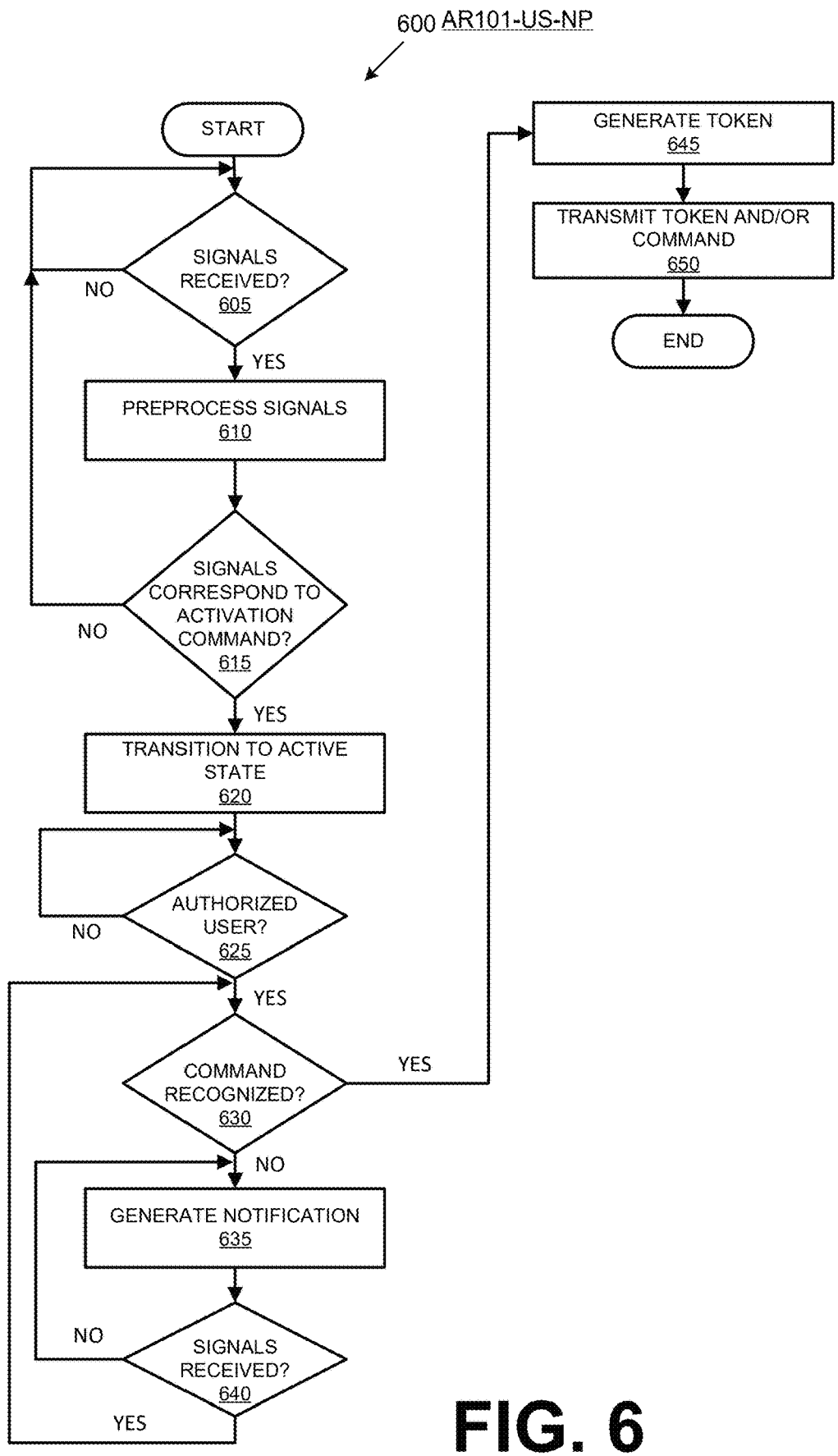
FIG. 6 is a flow diagram illustrating an example process for determining and transmitting a device command to one or more computing devices.

FIG. 6 is a flowchart of an exemplary process 600 for determining and transmitting a device command to one or more computing devices 104, 106. Blocks of the process 600 can be executed by the computing device 102. The process 600 begins at block 605 in which a determination is made of whether one or more signals indicative of measured mental activity and/or biometric data of a user has been received. If no signals have been received, the process 600 returns to block 605. Otherwise, the measured signals are preprocessed at block 610. As discussed above, the measured signals may be preprocessed using suitable filtering techniques to convert the measurement signals from a first domain to a second domain.

At block 615, a determination is made of whether the converted signals corresponds to an activation command. For example, the classification module 208 may include a lookup table that relates signals with device commands. If the converted signals do not correspond to the activation command, the process 600 returns to block 605. Otherwise, the computing device 102 transitions from an energy-efficient mode to an active mode at block 620. In various implementations, the device commands correspond to a given mental task. For instance, the computing device 102 may be trained through the user performing preassigned mental tasks and associating the measured and/or converted signals with the preassigned mental tasks. The measured and/or converted signals can then be paired with a device command.

At block 625, a determination is made whether the converted signals correspond to an authorized user. If the converted signals do not correspond to the authorized user, the process 600 returns to block 625. Otherwise, the classification module 208 determines whether the converted signals correspond to a device command within the lookup table at block 630. If the converted signals do not correspond to a device command, the computing device 102 may cause a notification to be generated at block 635. The notification may indicate to the user that a device command was not recognized and to perform an activity again. The computing device 102 may cause haptic feedback at the computing device 102. In other examples, the computing device 102 may be paired with a mobile electronic device, e.g., a smartphone, etc., of the user. The computing device 102 may send a signal to the paired mobile electronic device such that the mobile electronic device generates a visual or an audio alert at the mobile electronic device.

At block 640, a determination is made of whether one or more signals indicative of measured mental activity and/or biometric data of a user has been received. If no signals have been received within a predetermined time period, the process 600 returns to block 635. Otherwise, the process 600 returns to block 630.

If the converted signals correspond to a device command, a token is generated at block 645. In some implementations, the token can include verification data and the determined device command. In some implementations, the token may be a one-time token. At block 650, the token and/or the determined device command are transmitted to one or more computing device 104, 106.

Figure 7:
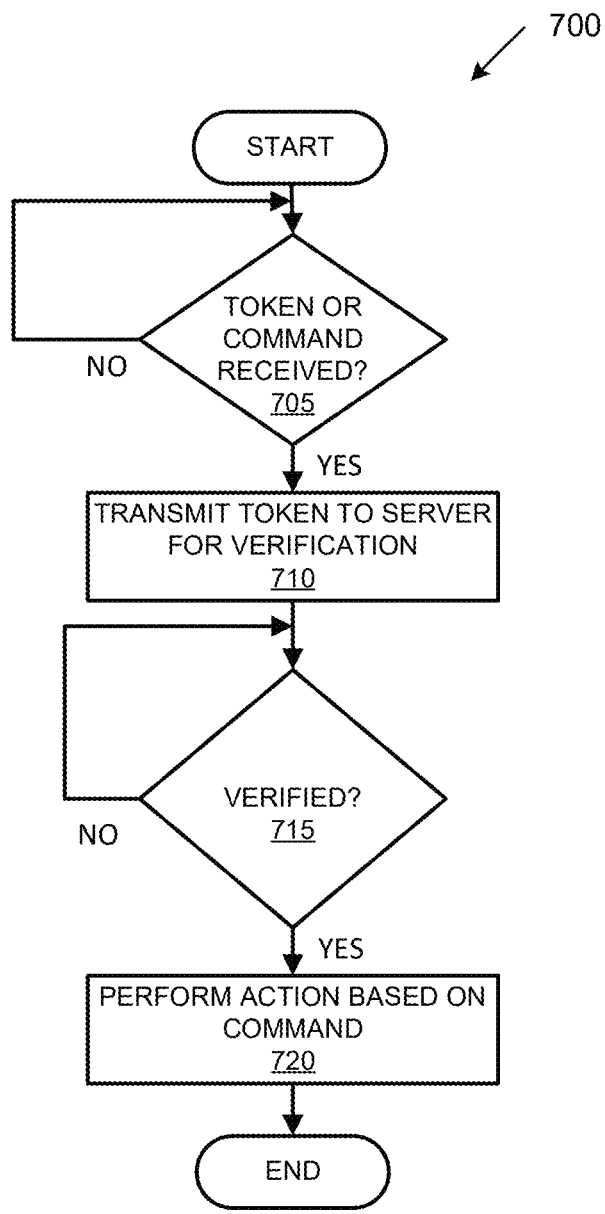
FIG. 7 is a flow diagram illustrating and example process for actuating a computing device based on a received device command.

FIG. 7 is a flowchart of an exemplary process 700 for actuating a computing device 104, 106 based on a received device command. Blocks of the process 700 can be executed by the computing device 104, 106. The process 700 begins at block 705 in which a determination is made of whether a device command and/or a token have been received. If the device command and/or the token have not been received, the process 700 returns to block 705. Otherwise, the token is transmitted to the server 108 for verification at block 710.

At block 715, a determination is made of whether a verification signal has been received from the server 108. If no verification signal has been received, the process 700 returns to block 715. Otherwise, the computing device 104, 106 performs an action corresponding to the device command. For example, the computing device 104, 106 may transition from a locked state to an unlocked state. In other examples, the computing device 104, 106 may perform a specified action corresponding to the device command.

In general, the computing systems and/or devices described may employ any of a number of computer operating systems, including, but by no means limited to, versions and/or varieties of the AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device comprising:
   at least one sensor configured to generate voltage signals indicative of a measured neurological impulse; and
   one or more application specific integrated circuit (ASIC) chips connected to the at least one sensor, the one or more ASIC chips configured to:
      receive the voltage signals indicative of the measured neurological impulse generated by the at least one sensor,
      digitize the received voltage signals indicative of the of the measured neurological impulse,
      determine whether the received voltage signals indicative of the measured neurological impulse corresponds to an activation command,
      transition the computing device from an energy-efficient mode to an active mode based on the determined activation command,
      determine a macro command for operating a destination computing device based on the digitized voltage signals indicative of the measured neurological impulse while the computing device is in the active mode, wherein the macro command comprises a plurality of discrete device commands that are communicated to the destination computing device, buffered using buffering capabilities of the destination computing device, and are sequentially executed for operating the destination computing device,
      generate verification data,
      encode the determined macro command for operating the destination computing device as a token that includes the generated verification data wherein the destination computing device verifies the generated verification data prior to performing an action based on the macro command, and
      transmit the token to the destination computing device wherein the one or more ASIC chips encodes a data indicative of the generated voltage signals from a first domain to a second domain and classifies the data indicative of the generated voltage signals encoded in the second domain via at least one of a support-vector machine or a deep neural network.

2. The computing device of claim 1, wherein the first domain comprises a time domain and the second domain comprises a frequency domain.

3. The computing device of claim 1, wherein the one or more ASIC chips access a database to compare the classified data indicative of the generated voltage signals to stored data, wherein the one or more ASIC chips are configured to transmit the macro command associated with the data indicative of the generated voltage signals to a particular computing device when the classified data indicative of the generated voltage signals corresponds to the stored data.

4. The computing device of claim 1, wherein the deep neural network comprises a convolutional neural network.

5. The computing device of claim 1, wherein the verification data comprise a randomly generated seed corresponding to a user.

6. The computing device of claim 1, wherein the token is broadcast to one or more computing devices within communication range of the computing device.

7. A computing device comprising:
   at least one sensor configured to generate voltage signals indicative of a measured neurological impulse, wherein the at least one sensor is implanted into brain tissue; and
   one or more application specific integrated circuit (ASIC) chips connected to the at least one sensor, the one or more ASIC chips configured to:
      receive the voltage signals indicative of the measured neurological impulse generated by the at least one sensor,
      digitize the received voltage signals indicative of the of the measured neurological impulse,
      determine whether the received voltage signals indicative of the measured neurological impulse correspond to an activation command,
      transition the computing device from an energy-efficient mode to an active mode based on the determined activation command,
      determine a macro command for operating a destination computing device based on the measured neurological impulse while the computing device is in the active mode, wherein the macro command comprises a plurality of discrete device commands that are communicated to the destination computing device, buffered using buffering capabilities of the destination computing device, and are sequentially executed for operating the destination computing device,
      generate verification data,
      encode the determined macro command for operating the destination computing device as a token that includes the generated verification data wherein the destination computing device verifies the generated verification data prior to performing an action based on the macro command, and transmit the token to the device, wherein the one or more ASIC chips encodes a data indicative of the generated voltage signals from a first domain to a second domain and classifies the data indicative of the generated voltage signals encoded in the second domain via at least one of a support-vector machine or a deep neural network.

8. The computing device of claim 7, wherein the one or more ASIC chips encodes the data indicative of the generated voltage signals from the first domain to the second domain via Riemannian Geometry.

9. The computing device of claim 7, wherein the first domain comprises a time domain and the second domain comprises a frequency domain.

10. The computing device of claim 7, wherein the one or more ASIC chips are configured to classify the data indicative of the generated voltage signals encoded in the second domain.

11. The computing device of claim 10, wherein the one or more ASIC chips access a database to compare the classified data indicative of the voltage signals to stored data, wherein the one or more ASIC chips are configured to transmit the macro command associated with the data indicative of the generated voltage signals to a particular computing device when the classified data indicative of the generated voltage signals corresponds to the stored data.

12. The computing device of claim 1, wherein the deep neural network comprises a convolutional neural network.

13. The computing device of claim 7, wherein the verification data comprise a randomly generated seed corresponding to a user.

14. The computing device of claim 7, wherein the token is broadcast to one or more computing devices within communication range of the computing device.

15. A method for controlling a device based on a measured neurological impulse, the method comprising:

establishing a connection between at least one sensor and at least one ASIC;

measuring the neurological impulse with the at least one sensor;

generating voltage signals indicative of the measured neurological impulse with the at least one sensor;

receiving the generated voltage signals indicative of the measured neurological impulse by the at least one ASIC;

digitizing the generated voltage signals indicative of the of the measured neurological impulse;

determining whether the received voltage signals indicative of the measured neurological impulse corresponds to an activation command;

transitioning the computing device from an energy-efficient mode to an active mode based on the determined activation command;

determining a macro command for operating the device based on the voltage signals indicative of the measured neurological impulse while the computing device is in the active mode, wherein the macro command comprises a plurality of discrete device commands that are communicated to the destination computing device, buffered using buffering capabilities of the destination computing device, and are sequentially executed for operating the destination computing device;

generating verification data based on a random seed for verifying a user;

encoding the determined macro command based on the measured neurological impulse as a token that includes the generated verification data, wherein the device verifies the generated verification data prior to performing an action based on the macro command;

encoding the measured neurological impulse from a first domain to a second domain;

classifying the neurological impulse encoded in the second domain via at least one of a support-vector machine or a deep neural network; and broadcasting the token to the device within a communication range of the device.

16. The method of claim 15, wherein determining the macro command further comprises comparing the classified neurological impulse to stored data, wherein the at least one ASIC chip is configured to transmit data to the destination computing device when the classified data corresponds to the stored data.

* * * * *